United States Patent [19]

Motoda et al.

[11] 4,177,002
[45] Dec. 4, 1979

[54] COOPERATIVE DRIVE ROBOT

[75] Inventors: Kenro Motoda, Tokyo; Kensuke Hasegawa, Yokohama, both of Japan

[73] Assignee: Motoda Denshi Kogyo Kabushiki Kaisha, Tokyo, Japan

[21] Appl. No.: 888,148

[22] Filed: Mar. 16, 1978

[30] Foreign Application Priority Data

Jun. 8, 1977 [JP] Japan .................................. 52/67592
Jun. 13, 1977 [JP] Japan .................................. 52/69677
Dec. 8, 1977 [JP] Japan ................................ 52/147665

[51] Int. Cl.² ............................ B25J 3/00; B66C 23/00
[52] U.S. Cl. ................................... 414/751; 414/696; 414/733
[58] Field of Search ............ 214/1 CM, 139; 414/696, 414/729, 733, 738, 749, 751; 239/227

[56] References Cited

U.S. PATENT DOCUMENTS

| 3,352,441 | 11/1967 | Alden ..................................... 214/139 |
| 3,482,711 | 12/1969 | Böhme et al. ...................... 214/1 CM |
| 3,995,746 | 12/1976 | Usagida ......................... 214/1 CM X |

FOREIGN PATENT DOCUMENTS

2433954 1/1976 Fed. Rep. of Germany ....... 214/1 BD

*Primary Examiner*—L. J. Paperner
*Attorney, Agent, or Firm*—Wenderoth, Lind & Ponack

[57] ABSTRACT

A robot arrangement adapted to carry a load such as an article, a tool or a cargo to a specified position includes a main robot capable of active movement of the load in rectilinear directions and passive movement in directions parallel to a plane perpendicular to the rectilinear directions, and at least one sub robot capable of active movement of the load in directions parallel to the plane. A flexible connection allows passive movement of the load with respect to the sub robot in the rectilinear directions.

9 Claims, 7 Drawing Figures

COOPERATIVE DRIVE ROBOT

BACKGROUND OF THE INVENTION

This invention relates to cooperative drive robots.

Figure 1:
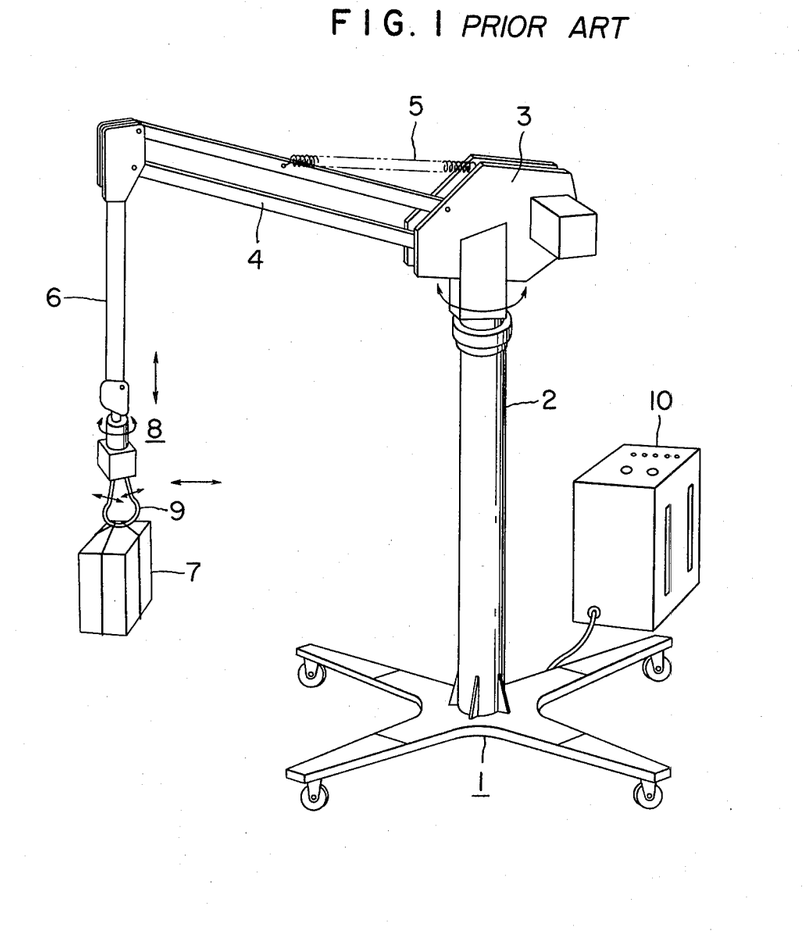
FIG. 1 is a perspective view of the construction of a conventional robot.

A conventional robot for moving a heavy load such as an article, a tool, or a cargo to a desired position is as shown in FIG. 1, for instance. That is, a swingably driven driving box 3 is mounted on the upper portion of a base in the form of a pole 2 erected on a truck 1, and horizontal arms 4 form a parallelogram link mechanism which is coupled through a balancing spring 5 to the box 3. A vertical arm 6 is extended downwardly from one end of the horizontal arm 4, and a holding section 8 for holding a load 7 is provided at the lower end of the vertical arm 6. The load can be held by closing a holding member 9 provided on the bottom of the holding section 8. The circular movement of the robot, the vertical and horizontal movements and circular movement of the holding section 8, and the opening and closing operations of the holding member 9 are controlled by a control box 10. This control box is employed to move the holding section 8 vertically and/or horizontally to carry the load to a specified position in accordance with position data from a preset program or a computer. However, the weight of the load 7 is not always constant, and therefore the arms 4 and 6 may be somewhat bent because of variations in weight and moving speed. Therefore, even if the holding section 8 is moved in accordance with the position data specified, the actual position of the load 7 carried by the holding section 8 is different from the specified position.

The circular motion of the driving box 3 is one of the factors which will lower the positional accuracy because there is a space between the driving section and the holding section. In other words, in carrying a load by holding it with the arm of the conventional robot, the arm is turned by applying a driving force to the base of the arm. Accordingly, it is difficult to accurately carry the load to the specified position because of the bending, the inertia, and the circular motion of the arm.

Furthermore, where there is a distance between the holding section and the driving section at the base of the arm in the conventional robot, it is necessary to increase the structural strength of the arm and also the driving power, and this leads to an increase of the inertia and the size of the robot. This is another disadvantage of the conventional robot.

In addition, in the case where it is required to lift and carry a load and to place it at a specified position with high accuracy, heretofore one robot is used, and a position instruction obtained through an intricate correction calculation in a computer or the like is issued to the robot. Accordingly, the robot control system is necessarily intricate and expensive.

Moreover, depending on the position of the load 7, it is required to control the holding direction of the holding section 8 which is the hand of the robot. If it is necessary to maintain unchanged the holding direction of the holding section, the direction control must be carried out by intricate calculation. This is an additional drawback accompanying the conventional robot.

SUMMARY OF THE INVENTION

Accordingly, a first object of this invention is to provide a cooperative drive rotor in which a plurality of robots are employed to provide capabilities and functions necessary for carrying out intended work, the robots being combined together to smoothly carry out the intended work with simple construction.

A second object of the invention is to provide a cooperative drive robot in which a plurality of robots having different capabilities and functions are combined together to facilitate the control of an arm, thereby to accurately control the acutal position of a load carried by the robot with respect to a specified position.

A third object of the invention is to provide a cooperative drive robot in which a plurality of robots having different capabilities and functions are combined together to carry a load to a specified position, and in which the horizontal and/or vertical movement of the load is effected straightly, thereby to accurately carry the load to the specified position.

A fourth object of the invention is to provide a cooperative drive robot in which the holding direction of a load holding section thereof is maintained unchanged, thereby to readily achieve the movement of the load in a predetermined direction.

A fifth object of the invention is to provide a cooperative drive robot which is small in size and can be driven with a relatively small power.

The novel features which are considered characteristic of this invention are set forth in the appended claims. This invention itself, however, as well as other objects and advantages thereof will be best understood by reference to the following detailed description of illustrative embodiments, when read in conjunction with the accompanying drawings.

DETAILED DESCRIPTION OF THE INVENTION

In this invention, a plurality of robots which, having different functions, are insufficient for individually carrying out work intended to be done, are systematically combined together in such a manner that the capabilities thereof are mutually complemented, thereby to smoothly achieve the intended work. The systematic combination is effected so that the active and passive degrees of freedom of the robots are complementarily linked.

Figure 2:
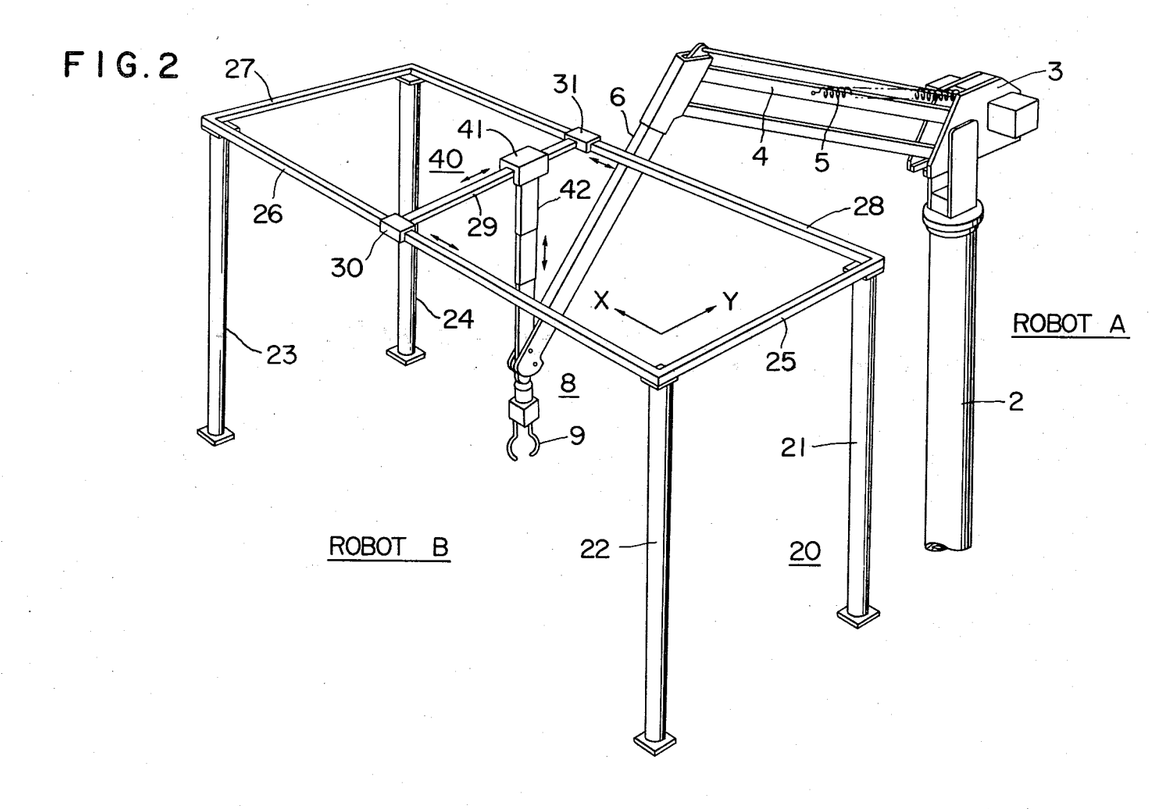
FIGS. 2 through 6 are perspective views showing various embodiments of this invention.

A first example of a cooperative drive robot according to this invention is shown in FIG. 2. A guide device 20 for guiding the horizontal movement of a holding section 8 of a first robot A (hereinafter referred to as "a main robot A" when applicable), and a drive control device 40 for running the holding section 8 in a horizontal direction form a second robot B (hereinafter referred to as "a sub robot B" when applicable). The holding section 8 is moved in a vertical direction by the main robot A and in a horizontal direction by the sub robot B systematically coupled to the main robot A, so that section 9 can be moved accurately to a specified position with a simple mechanism.

The guide device 20 of the sub robot B comprises four posts 21 through 24 erected at four points forming a rectangle, four guide rails 25 through 28 mounted on these four posts, and a running rail 29 adapted to extend between and be moved in directions parallel to guide rails 26 and 28. Running devices 30 and 31, e.g. wheels, are provided at both ends of the running rail 29 so that the latter can straightly (in the direction X) run along the guide rails 26 and 28. On the other hand, the drive control device 40 of the sub robot B comprises a drive truck 41 adapted to straightly (in the direction Y) run along the running rail 29, an expansion and contraction mechanism 42 fixedly secured at opposite ends thereof to the bottom of the drive truck 41 and to the holding section 8 of the main robot A and systematically coupling the robots A and B, a running drive means provided in the drive truck 41 for driving the latter, and running drive means provided in the running wheels 30 and 31 for driving the latter. The guide device 20 of the sub robot B is so designed and arranged that a load can be carried in a predetermined range (or area) to a position within compliance with the working range intended by the robot. In this example, the load is carried below the guide device 20.

The vertical movement of the holding section 8 is carried out by driving a driving box 3 of the main robot A in response to an instruction signal from a control box. In this operation, the expansion and contraction mechanism 42 is expanded or contracted passively in response to the active vertical movement of the holding section 8 caused by the main robot A. On the other hand, the holding section 8 is moved in a horizontal direction as the running wheels 30 and 31 and the drive truck 41 are straightly moved along the guide rails 26 and 28 and the running rail 29, respectively, by applying position and speed data from the control box to the drive contol device 40 of the sub robot B. In other words, as the drive truck 41 is moved in the X and Y directions, the holding section 8 is passively moved in the same direction through the expansion and contraction mechanism 42 which forms one unit with the drive truck 41. Thus, the horizontal movement of the holding section 8 is carried out without positive turning of the main robot A. The main robot A bears the weight of the load, while the sub robot B takes care of the movement of the load.

As is apparent from the above description, in the cooperative drive robot, the capability and function of the robot is divided into two parts. That is, the main robot A takes care of the lifting operation and mainly supports the weight of the load, while the sub robot B takes care of the horizontal movement and mainly the load carrying or positioning operation. As the two robots A and B are systematically combined together as described above, the load can be carried to a desired position with high accuracy. Furthermore, according to the invention, the end of the arm, adapted to hold a load, of the main robot is straightly moved while being guided by the guide device of the sub robot. Therefore, the load can be more accurately carried to the desired position without using active circular movement of robot A. In addition, the influence due to the bending and inertia of the arm can be eliminated, and the driving power can be reduced.

Figure 3:
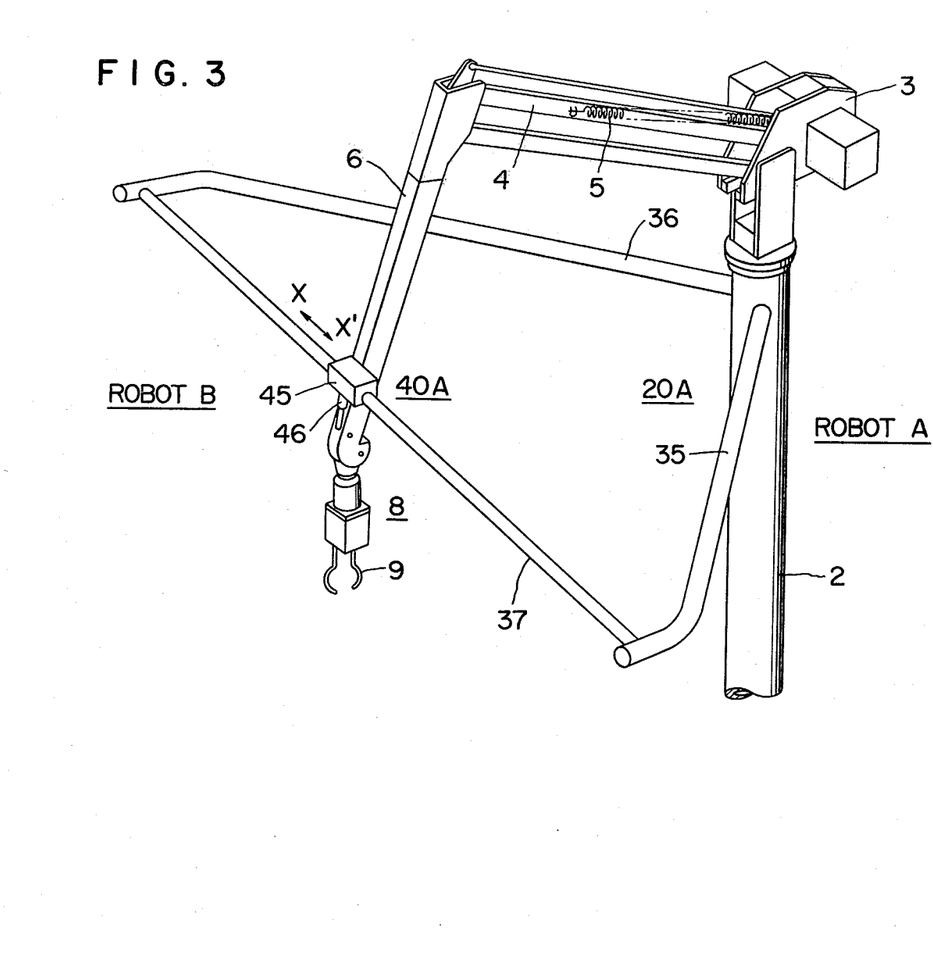

The guide device 20A of the sub robot B, as shown in FIG. 3, may be secured directly to the pole 2. More specifically, two stationary arms 35 and 36 horizontally open in the form of a sector are secured to the upper portion of the pole 2, and a straight guide bar 37 is connected to the ends of the stationary arms 35 and 36. A drive control device 40A is mounted on the guide bar 37 in such a manner that it can straightly slide along the guide bar 37. Furthermore, an expansion and contraction mechanism 46 having a rotatable fixing part is secured to the bottom of a running truck 45, and the holding section 8 of the main robot A is secured to the mechanism 46. In this case, the lifting work is actively carried out through the expansion and contraction mechanism 46 by the main robot A, while the carrying work in the direction X-X' is passively effected by straightly driving the running truck 45 of the sub robot B. In this case also, the load can be carried to a desired position with high accuracy.

In this connection, if the two stationary arms are made to be rotatable as one unit on the pole 2 or the pole 2 itself is made to be rotatable, the load carrying work can be effected at a given position around the robot A.

Figure 4:
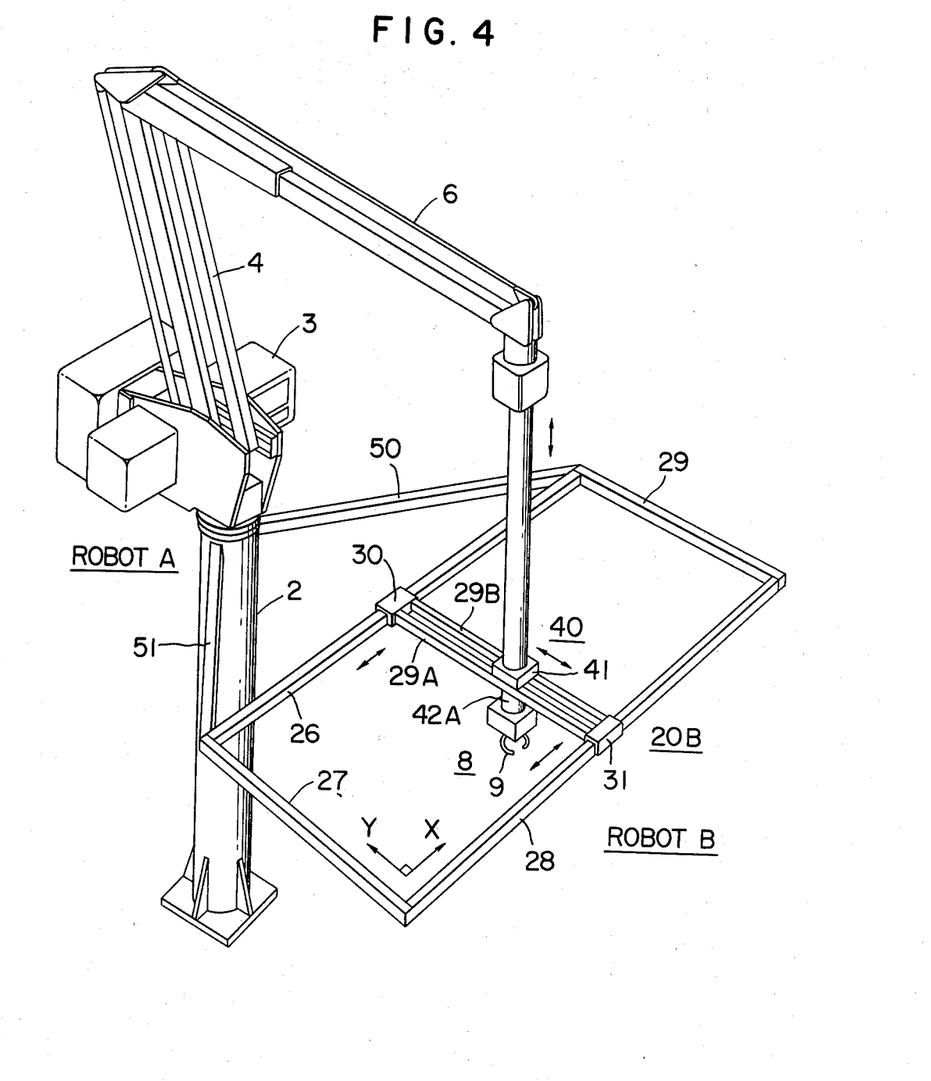

The same effect can be obtained by fixedly securing a guide device 20B of the sub robot B such as shown in FIG. 4 through mounting arms 50 and 51 to the pole 2 and by controlling the lifting operation from above the guide device 20B by the main robot A, as shown in FIG. 4. In this example, running rails 29A and 29B are extended in parallel in the direction Y, and the holding section 8 of the main robot is moved vertically through the space between the two running rails 29A and 29B.

Figure 5:
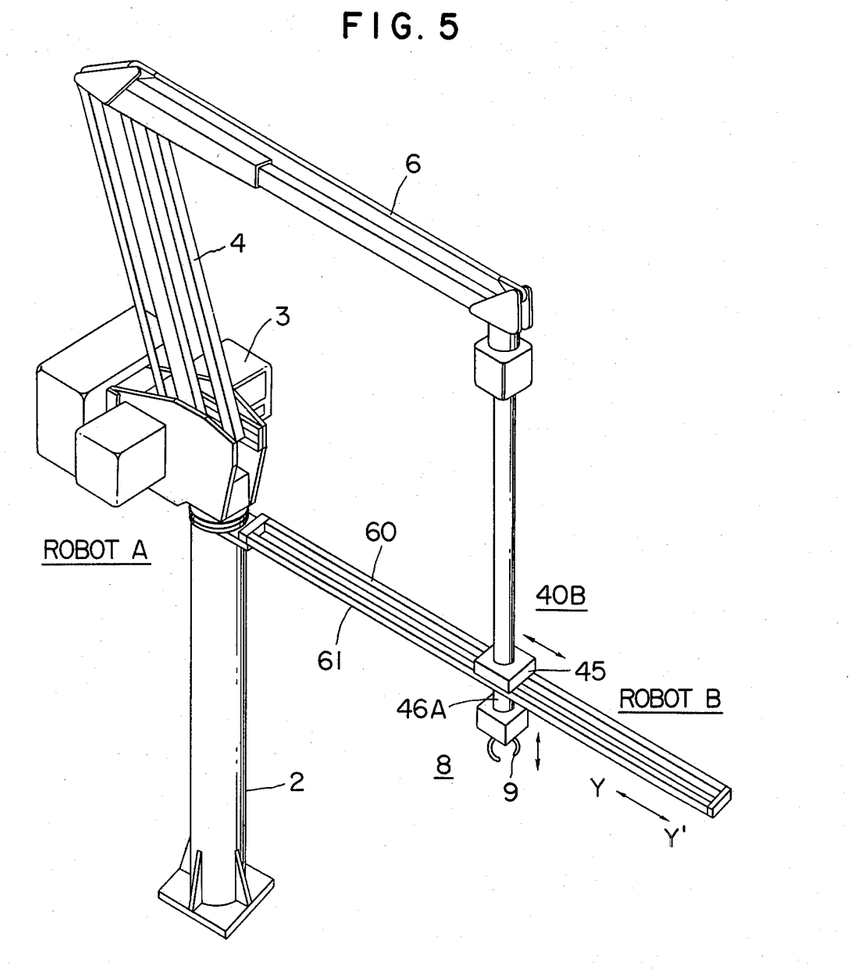

Another example of the cooperative drive robot is shown in FIG. 5, in which the horizontal movement is carried out along two parallel guide rails 60 and 61 of the sub robot B which are extended radially from the upper part of the pole 2, and the vertical movement of the holding section of the main robot A is effected through the space between the guide rails 60 and 61.

Figure 6:
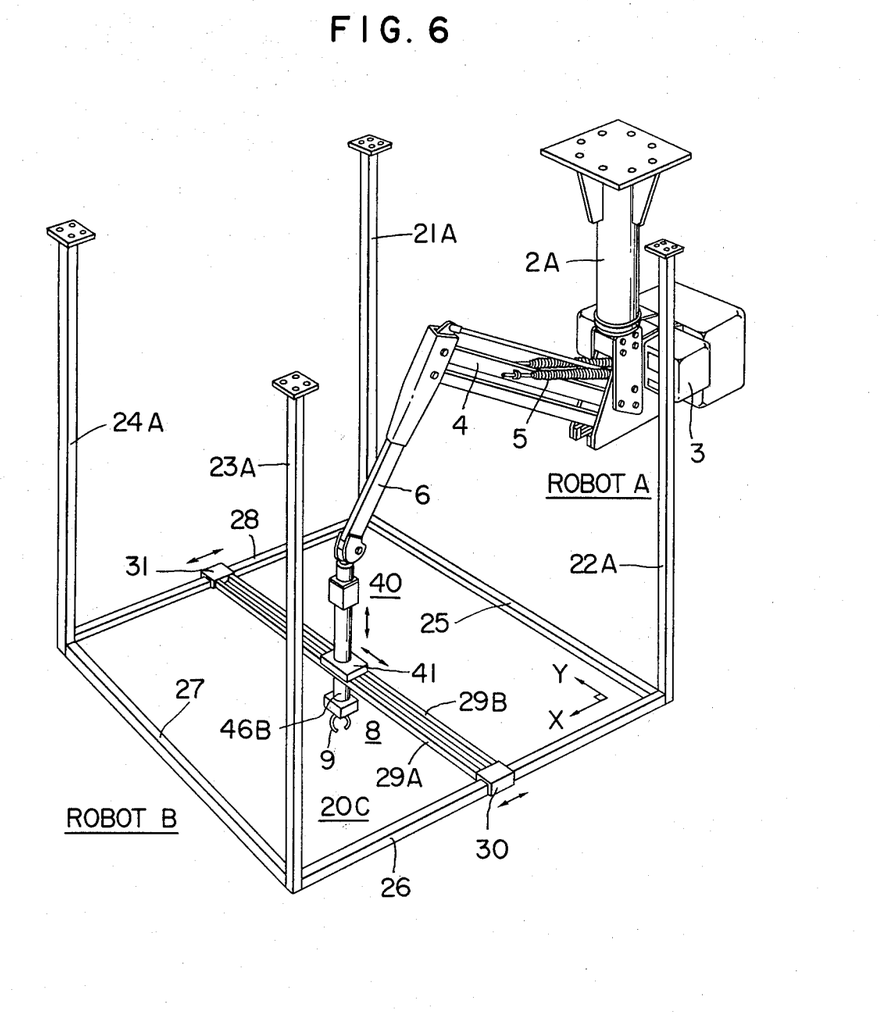

Shown in FIG. 6 is another example of the cooperative drive robot according to the invention, in which the main robot A and the sub robot B shown in FIG. 2 are designed so as to be mounted on a ceiling or the like in a working room, and the lifting control drive is carried out above a guide device 20C of the sub robot B, while the carrying operation is effected below the guide device. In this connection, the cooperative drive robot may be so designed that the main robot A and the sub robot B are moved along rails provided on the ceiling or the like.

In the above-described examples, the holding section 8 of the main robot A is moved vertically by means of the expansion and contraction mechanism (42, 42A and 46). However, if the holding section is fixedly fastened to the drive truck 41 or the running truck 45 of the sub robot B, the holding member 9 may be moved vertically by means of a rope or a chain. Furthermore, in the above-described examples, only one sub robot is employed. However, the invention is not limited thereto or thereby. That is, three robots or more can be combined together. In addition, it goes without saying that in any of the above-described examples, the same effects can be obtained.

Figure 7:
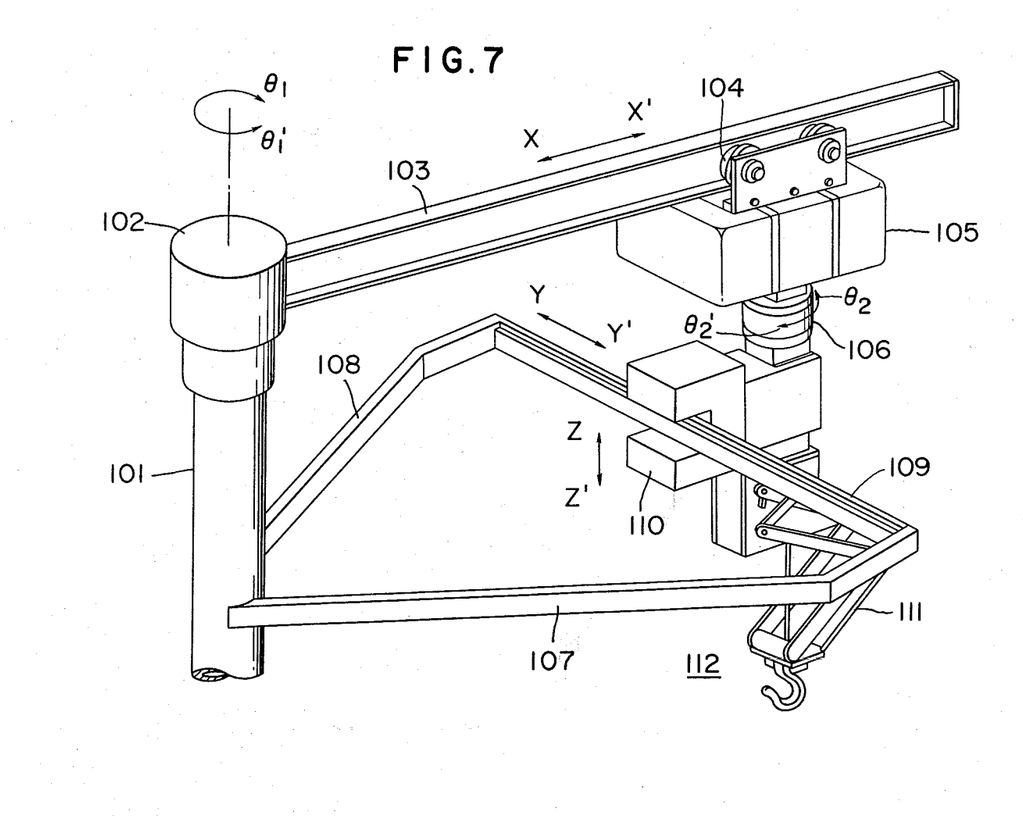
FIG. 7 is a perspective view showing an application of the invention.

Another example of the cooperative drive robot according to the invention includes a robot such as described above provided with a coordinate conversion mechanism, as shown in FIG. 7. Provided on the top portion of a pole 101 is a rotatable circular motion mechanism 102, to one side of which is straightly extended guide rail 103 is fixedly secured. A running drive device 105 for running radially with respect to the pole 101 is hung through running wheels 104 on the guide rail 103, and a circular motion mechanism 106 is rotatably connected to the bottom of the running drive device 105. Furthermore, a guide rail 109 is connected through two arms 107 and 108 to the upper portion of the pole 101. A running drive device 110 is connected to the lower portion of the circular motion mechanism 106 in such a manner that it can run along the guide rail 109. A holding section 112 is coupled through a folding expansion and contraction mechanism 111 to the lower portion of the running drive mechanism 110.

In operation, a load held by the holding section 112 is moved vertically (Z-Z') by means of the expansion and contraction mechanism 111, and is also moved in the direction (Y-Y') by the running operation, along the guide rail 109, of the running drive device 110. When the running drive device 110 runs along the guide rail 109, the guide rail 103 is turned ($\theta_1$-$\theta_1'$) through the circular motion mechanism 102 by the circular motion ($\theta_2$-$\theta_2'$) of the circular motion mechanism 106, while the running drive device 105 is moved slightly in the direction X-X'. As the running drive device 105 runs along the guide rail 103, the load held through the expansion and contraction mechanism of the running drive device 110 by the holding section 112 is moved in the direction X-X'. In any of the above-described load movements, the holding section 112 provided through the expansion and contraction mechanism is maintained in one and the same direction (facing the pole 101; more specifically, facing in a direction perpendicular to the guide rail 109). Accordingly, the robot according to the invention is suitable for a case where, for instance, aligned loads are to be piled one on top of another.

What is claimed is:

1. A cooperative drive robot arrangement for moving a load to a desired position, said robot arrangement comprising:
   a main robot including a load holding section, means for actively moving said holding section in opposite substantially rectilinear directions, and means for enabling said moving means to be passively moved in directions parallel to a plane transverse to said rectilinear directions, said main robot being free of means for actively moving said moving means or said holding section in directions parallel to said plane;
   at least one sub robot including a guide device within said plane, and a drive device mounted on said guide device for active movement therealong in directions within said plane, said drive device being prevented from movement relative to said guide device in said rectilinear directions; and
   connecting means for flexibly connecting said holding section to said drive device such that said holding section is actively moved by said drive device in directions parallel to said plane, thereby enabling said moving means of said main robot to be passively moved in directions parallel to said plane, and such that said holding section is passively movable with respect to said drive device in said rectilinear directions upon active movement of said holding section in said rectilinear directions by said moving means of said main robot.

2. A robot arrangement as claimed in claim 1, wherein said main robot further includes a base, said means for actively moving said holding section comprises an arm member extending outwardly from said base, said arm member having a first end connected to said holding section and a second end pivotally connected to said base for rotation about an axis extending parallel to said rectilinear directions.

3. A robot arrangement as claimed in claim 2, wherein said guide device comprises first and second parallel spaced rails within said plane, and a third rail extending between and transverse to said first and second rails within said plane, and said drive device comprises means at opposite ends of said third rail for driving said third rail along said first and second rails in opposite directions extending parallel thereto, and drive means movable mounted on said third rail for movement therealong in opposite directions extending parallel thereto.

4. A robot arrangement as claimed in claim 3, wherein said connecting means comprises a contraction mechanism having a first end connected to a bottom portion of said drive means and a second end connected to a top portion of said holding section.

5. A robot arrangement as claimed in claim 3, wherein said connecting means comprises a longitudinal rod having a first end connected to said first end of said arm and a second end connected to said holding section, said rod extending through said drive means for sliding movement relative thereto in said rectilinear directions.

6. A robot arrangement as claimed in claim 2, wherein said guide device comprises a longitudinal rail mounted within said plane, and said drive device comprises drive means movable mounted on said rail for movement therealong in opposite directions extending parallel thereto.

7. A robot arrangement as claimed in claim 6, wherein said connecting means comprises a contraction mechanism having a first end connected to a bottom portion of said drive means and a second end connected to a top portion of said holding section.

8. A robot arrangement as claimed in claim 6, wherein said connecting means comprises a longitudinal rod having a first end connected to said first end of said arm and a second end connected to said holding section, said rod extending through said drive means for sliding movement relative thereto in said rectilinear directions.

9. A robot arrangement as claimed in claim 1, wherein said main robot further includes a vertically extending base having a vertical axis, said guide device comprises a guide rail extending in said plane orthogonally of said base, said drive device comprises drive means movably mounted on said guide rail for movement therealong in opposite directions extending parallel thereto, said connecting means comprises an expansion member depending from said drive means and supporting said holding section, and further comprising a radial rail extending horizontally radially from said base, said radial rail having a first end pivotally connected to said base for rotation about said vertical axis, and means flexibly connected to said drive means and mounted on said radial rail for radial movement therealong, for, upon movement of said drive means along said guide rail, causing said radial rail to rotate about said axis.

* * * * *